United States Patent
Yoshinaga et al.

(10) Patent No.: US 7,948,449 B2
(45) Date of Patent: May 24, 2011

(54) DISPLAY CONTROL PROGRAM EXECUTED IN GAME MACHINE

(75) Inventors: Takumi Yoshinaga, Ohta-ku (JP); Kouji Tsuchiya, Ohta-ku (JP); Takenao Sata, Ohta-ku (JP); Keiichi Noda, Ohta-ku (JP)

(73) Assignee: Sega Corporation, Tokyo (JP)

( * ) Notice: Subject to any disclaimer, the term of this patent is extended or adjusted under 35 U.S.C. 154(b) by 875 days.

(21) Appl. No.: 11/904,738

(22) Filed: Sep. 28, 2007

(65) Prior Publication Data

US 2008/0100531 A1 May 1, 2008

Related U.S. Application Data

(63) Continuation of application No. PCT/JP2006/306528, filed on Mar. 29, 2006.

(30) Foreign Application Priority Data

Mar. 31, 2005 (JP) ................................ 2005-102227

(51) Int. Cl.
*G09G 5/00* (2006.01)
(52) U.S. Cl. ......... 345/1.1; 345/156; 345/162; 345/901; 463/37; 463/1; 463/43
(58) Field of Classification Search ............ 345/1.1–1.3, 345/156–169, 104, 901, 902; 463/3–6, 37–38, 463/1, 43, 44, 58; 273/148 B, 148 R; 178/18.01, 178/18.03, 18.04, 18.05, 18.06, 18.07, 19.01–19.05
See application file for complete search history.

(56) References Cited

U.S. PATENT DOCUMENTS 5,969,697 A 10/1999 Tani et al.
6,100,857 A 8/2000 Tani et al.
(Continued)

FOREIGN PATENT DOCUMENTS

EP 0230241 7/1987
(Continued)

OTHER PUBLICATIONS

Craig Harris: IGN: E3 2004: The Nintendo DS: Revealed: Internet Citation, [Online] May 11, 2004, XP002438026 Retrieved from Internet: URL:http://gameboy.ign.com/articles/513/513188p1.html> [retrieved on Jun. 18, 2007].

(Continued)

*Primary Examiner* — Lun-Yi Lao
(74) *Attorney, Agent, or Firm* — Jordan and Hamburg LLP (57) ABSTRACT

In a game machine, image display not giving the player a feeling of oddness or disadvantage during game progress even if a non-display at a physical distance is present between different display screen areas. The game machine executes program for controlling image display of first and second display screens on both sides of a non-display area. To move an object from the first to the second display screen and display it there. The movement angle and movement speed are calculated at the display coordinate position of the object displayed on the first display screen, and the movement distance which the object moves through the non-display area from the movement angle is determined. Further, a preset additional distance corresponding to the object to the movement distance is added to use it as a virtual movement distance. The object on the second display screen is displayed when the time required for the object to move the virtual movement distance has elapsed.

20 Claims, 12 Drawing Sheets

U.S. PATENT DOCUMENTS

| | | |
|---|---|---|
| 6,394,897 B1 * | 5/2002 | Togami ............................. 463/4 |
| 6,441,802 B1 | 8/2002 | Tani et al. |
| 2002/0171628 A1 | 11/2002 | Tani et al. |
| 2003/0078086 A1 | 4/2003 | Matsuyama et al. |
| 2004/0014525 A1 | 1/2004 | Suganuma |
| 2004/0063482 A1 | 4/2004 | Toyoda |
| 2006/0178213 A1 * | 8/2006 | Ohta et al. ....................... 463/37 |

FOREIGN PATENT DOCUMENTS

| | | | |
|---|---|---|---|
| EP | 1864699 | * | 12/2007 |
| JP | 4-307087 | | 10/1992 |
| JP | 6-044001 | | 2/1994 |
| JP | 6-314181 | | 11/1994 |
| JP | 7-116341 | | 5/1995 |
| JP | 2003-126548 | | 5/2003 |
| JP | 2004-8706 | | 1/2004 |
| JP | 2005-278938 | | 10/2005 |

OTHER PUBLICATIONS

"Nintendo DS release data" Internet Citation, [Online] Nov. 20, 2004, XP002374985 Retrieved from the Internet: URL:http://www.gamefaqs.com/portable/ds/data/925329.html> [retrieved on Mar. 30, 2006].

Nintendo: "Nintendo DS Technical Specs" Internet Citation, [Online] Nov. 20, 2004, XP002437722 Retrieved from the Internet: URL:http://web.archive.org/web/20041112133534/http://www.nintendo.com/tec hspecds> [retrieved on Jun. 12, 2007].

* cited by examiner

| OBJNo. | TRAVEL SPEED | RELATIVE DISPLAY DISTANCE |
|---|---|---|
| OBJ00 | V00 | d00 |
| OBJ01 | V01 | d01 |
| OBJ02 | V02 | d02 |
| ... | ... | ... |
| ... | ... | ... |
| ... | ... | ... |
| OBJn | Vn | dn |

FIG.17

| OBJsize | OBJspd | ADDITIONAL DISTANCE |
|---|---|---|
| L | Low | 0 |
| L | Medium | α Lm |
| L | High | α Lh |
| M | Low | α Ml |
| M | Medium | α Mm |
| M | Higjh | α Mh |
| S | Low | α Sl |
| S | Medium | α Sm |
| S | High | α Sh | ent
DISPLAY CONTROL PROGRAM EXECUTED IN GAME MACHINE

CROSS REFERENCE TO RELATED APPLICATIONS

This application is a continuation of International Application No. PCT/JP2006/306528, filed on Mar. 29, 2006, now pending, herein incorporated by reference. Further, this application is based upon and claims the benefit of priority from the prior Japanese Patent Application No. 2005-102227, filed on Mar. 31, 2005, the entire contents of which are incorporated herein by reference.

TECHNICAL FIELD

The present invention relates to a display control program executed in a game machine, and, more particularly, to a display control program in a game machine having a plurality of display screens.

BACKGROUND ART

In recent years, a small-sized game machine that can be carried around (portable game machine) has become widespread, and the contents of executable game programs have become more complicated as processing units come to work at higher speed and memory capacities gets larger. Under such a circumstance, a portable game machine having two display screens has emerged, in which game machine one display screen is used for user operation, and the other display screen is used for displaying a game object, etc.

Figure 1:
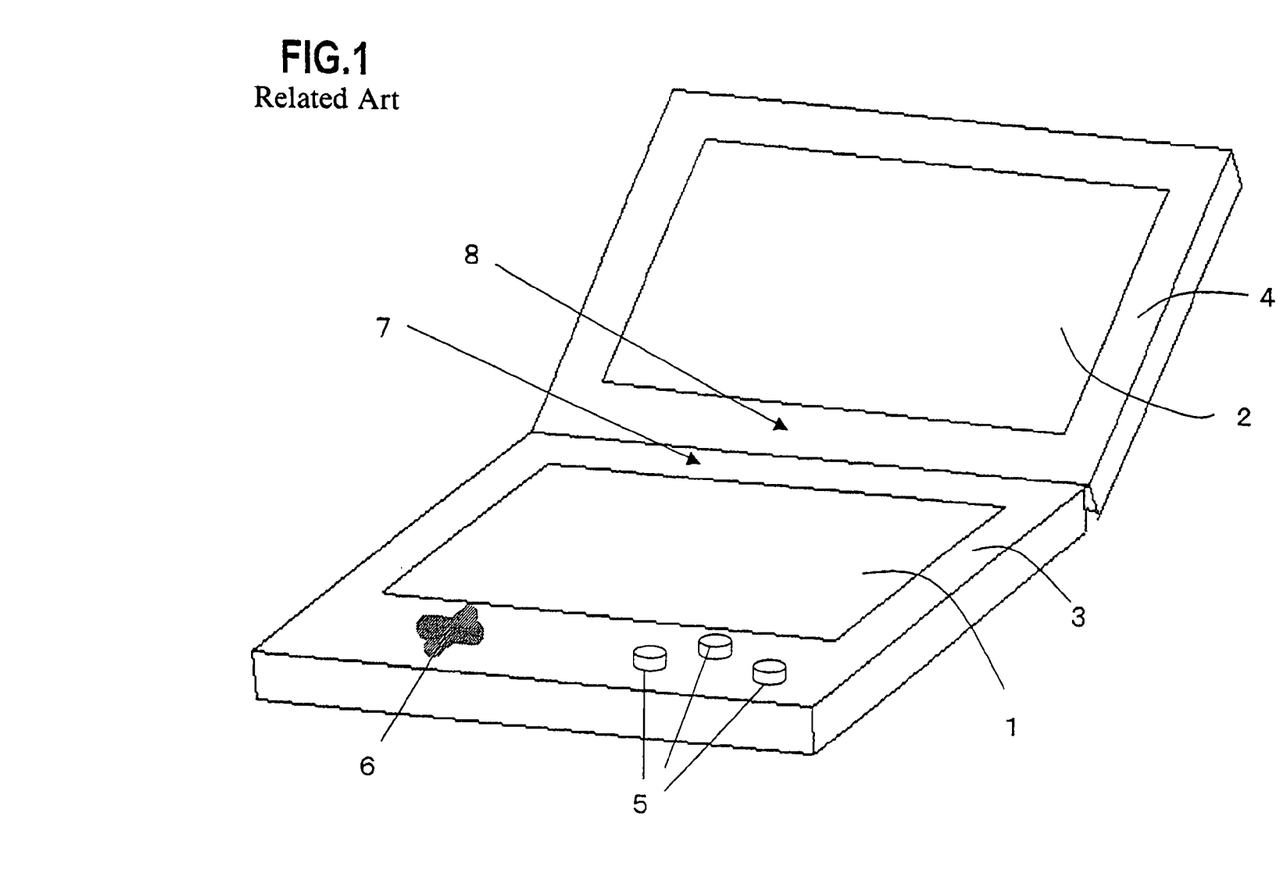
FIG. 1 is a diagram of the external configuration of an example of a portable game machine having two screens.

FIG. 1 is a diagram of the external configuration of an example of such a portable game machine having two screens.

The portable game machine includes a first display screen 1, a second display screen 2, an apparatus case 3 carrying the first display screen 1, and an apparatus case 4 carrying the second display screen 2. The apparatus cases 3 and 4 can be folded together so that the first and second display screens 1 and 2 face each other.

The first display screen 1 is used primarily for input operation in executing a game, and the apparatus case 3 having the first display screen 1 is provided with operation buttons 5, a direction key 6, etc.

In such case, a player inputs necessary information or instructions using the first display screen 1 while following the movement of game characters, etc., appearing on the second display screen 2 as the player executes a game.

Figure 2:
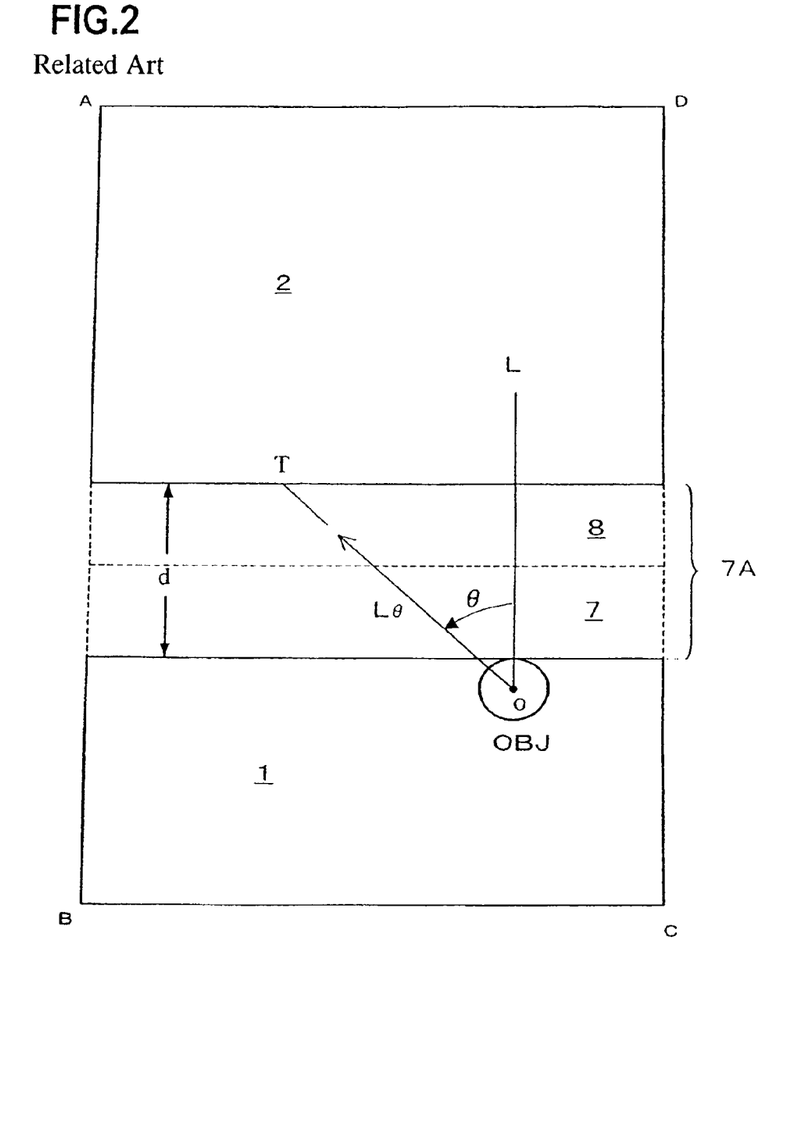
FIG. 2 is an explanatory view of a game machine that combines two screens into a pseudo single display screen.

A recently suggested technique is shown in FIG. 2, where the first display screen 1 and the second display screen 2 are combined consecutively into a pseudo single display screen encircled with four corners A, B, C, and D to enable execution of a game on a larger display screen.
(Japanese Patent No. 2,917,770)

Referring to FIG. 2 depicting the pseudo single display screen encircled with four corners A, B, C, and D, a case where an object OBJ moves across the boundary between the first display screen 1 and the second display screen 2 is considered.

As shown in FIG. 2, a nondisplay area 7A is present between the first and second display screens 1 and 2, which nondisplay area 7A is formed of display frame portion areas 7 and 8 of the apparatus cases 3 and 4 that are adjacent to each other. Between the first and second display screens 1 and 2, therefore, a distance having a physical size d is present.

Figure 3:
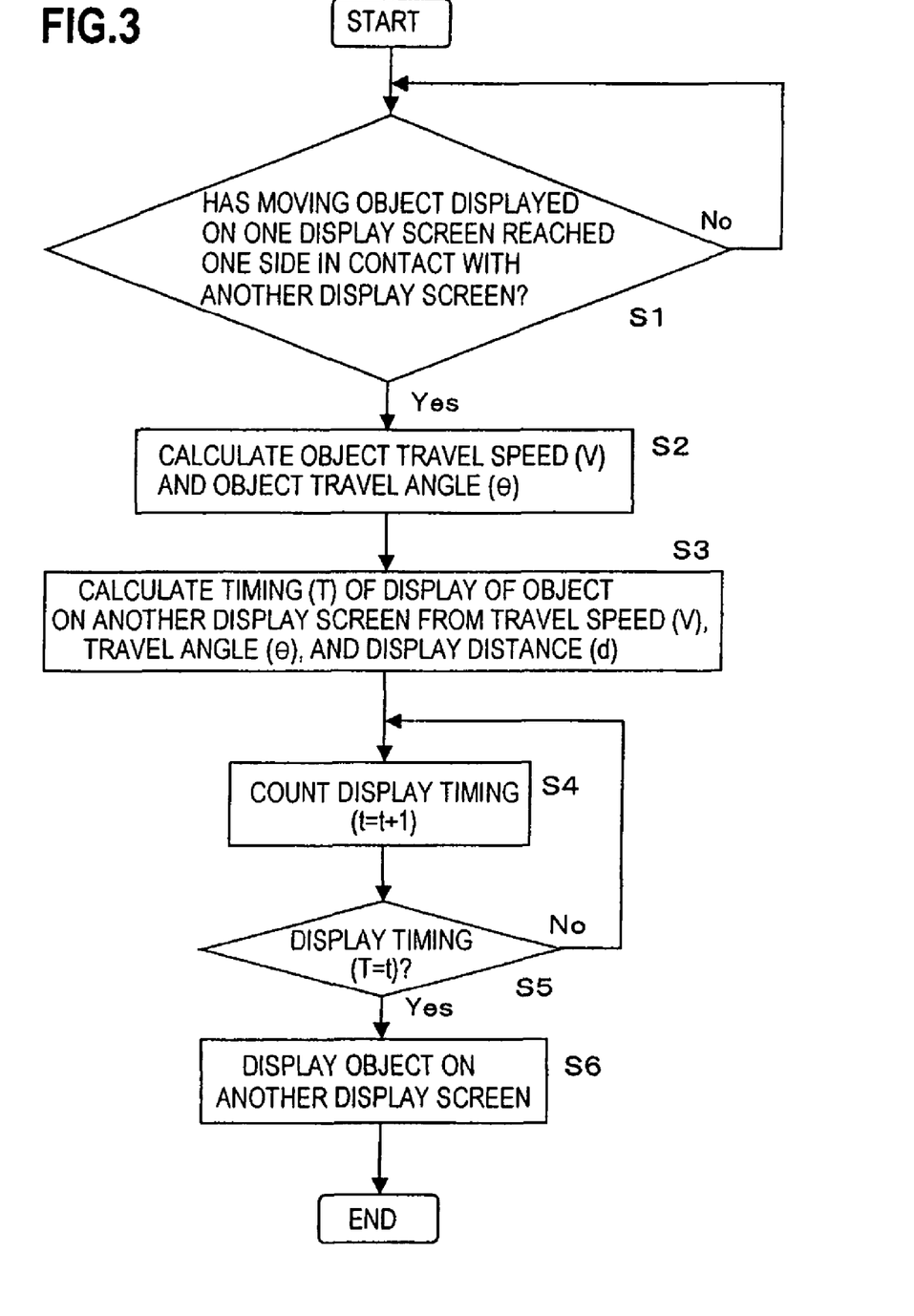
FIG. 3 is an explanatory view of control of display in object move from a first display screen to a second display screen.

In such a case, control of object display in move from the first display screen 1 to the second display screen 2 according to a flow shown in FIG. 3 is assumed in consideration of a time for the object to take to move through the distance having the size d.

In FIG. 3, whether the object OBJ displayed in move on the first display screen 1 has reached an end side of the first display screen 1, which end side is adjacent to the second display screen 2 via the nondisplay area 7A, is determined (step S1). In this determination, the reference point of the object OBJ is determined to be, for example, the central position O of the object OBJ, and when the coordinate position of the reference point of the object OBJ on the first display screen 1 indicates a given size of distance to the side of first display screen 1 that is in contact with the nondisplay area 7A, the object OBJ's reaching the end side of the first display screen 1 is determined (Yes at step S1).

Subsequently, a travel speed (V) and a travel angle (θ) of the object OBJ are calculated (step S2).

Then, based on the calculated travel speed (V) and travel angle (θ) of the object OBJ and the distance d between the first and second display screens, timing T is calculated, in which timing T the object OBJ starts to appear on another display screen, i.e., the second display screen 2 (step 3). This timing T is given by the following equation.

$$T = d/\cos\theta/v$$

where v is the travel speed of the object OBJ.

At the same time, counting of display timing is carried out (step S4). When a display timing count value matches the timing T (Yes at step S5), an object image is generated to display an image of the object OBJ at a corresponding display position on the second display screen 2, which display position is on an extension line along the travel angle from the first display screen 1, and the generated object image is displayed (step S6).

DISCLOSURE OF THE INVENTION

Problems to be Solved by the Invention

When the object OBJ on display is moved from the first display screen 1 to the second display screen 2, however, a player's line of sight has difficulty in following the speed of the object OBJ that virtually moves through the nondisplay area 7A between the first and second display areas. This gives the player a feeling of oddness or disadvantage in game proceedings.

The object of the present invention, therefore, is to provide a program for controlling image display that does not give a player a feeling of oddness or disadvantage in game proceedings even when a nondisplay area having a physical distance is present between different display screen areas.

Means for Solving the Problems

An image display control program as a first aspect to achieve the above object of the present invention is a program executed in a game machine having a first display screen and a second display screen adjacent to each other across a nondisplay area and a program executing means, the program operable to drive the program executing means to carry out calculating a travel angle and a travel speed of an object at a display coordinate position on the first display screen when the object is displayed in move from the first display screen to the second display screen; calculating a travel distance of the object's travel through the nondisplay area from the calculated travel angle; reading out information of an additional distance from a memory means, the information being preset in correspondence to the object, to add the additional distance to the calculated travel distance to obtain a virtual travel distance, and calculating a travel time to take to travel through the virtual travel distance from the calculated travel speed and the virtual travel distance; and displaying the object on the second display screen when the calculated travel time has passed after the object has moved to disappear from the first display screen.

An image display control program as a second aspect to achieve the above object of the present invention is a program executed in a game machine having a first display screen and a second display screen adjacent to each other across a non-display area and a program executing means, the program operable to drive the program executing means to carry out calculating a travel angle and a travel speed of an object at a display coordinate position on the first display screen when the object is displayed in move from the first display screen to the second display screen; calculating a travel time for the object to take to travel through the nondisplay area from the calculated travel angle and the travel speed; and adding an additional time to the calculated travel time, the additional time being preset in correspondence to the object, to obtain a virtual travel time, and displaying the object on the second display screen when the virtual travel time has passed.

An image display control program as a third aspect to achieve the above object of the present invention is a program executed in a game machine having a first display screen and a second display screen adjacent to each other across a non-display area and a program executing means, the program operable to drive the program executing means to carry out calculating a travel angle of an object at a display coordinate position on the first display screen when the object is displayed in move from the first display screen to the second display screen; reading out a travel speed and a distance of the nondisplay area, the travel speed and the distance being preset on a table in correspondence to the object; calculating a virtual travel time to take to travel through the distance of the nondisplay area from the read out travel speed and distance of the nondisplay area; and displaying the object on the second display screen when the virtual travel time has passed.

An image display control program as a fourth aspect to achieve the above object of the present invention is the program of any one of the first to third aspects wherein the display coordinate position of the object is a position at which a given point as a reference point in the object has reached a point of a given distance from a side of the first display screen that is in contact with the nondisplay area.

An image display control program as a fifth aspect to achieve the above object of the present invention is the program of the first aspect, further comprising calculating the number of pixels forming the object; determining a size of the object from the calculated number of pixels; and obtaining an additional distance corresponding to the determined size from a plurality of additional distances that are preset in correspondence to sizes of the object on a table.

An image display control program as a sixth aspect to achieve the above object of the present invention is the program of the second aspect, further comprising calculating the number of pixels forming the object; determining a size of the object from the calculated number of pixels; and obtaining an additional time corresponding to the determined size from a plurality of additional times that are preset in correspondence to sizes of the object on a table.

An image display control program as a seventh aspect to achieve the above object of the present invention is the program of the first aspect, further comprising determining to which one of a plurality of speed references the calculated travel speed of the object is equivalent; and obtaining an additional distance corresponding to the determined speed reference from a plurality of additional distances that are preset in correspondence to the plurality of speed references on a table.

An image display control program as an eighth aspect to achieve the above object of the present invention is the program of the second aspect, further comprising determining to which one of a plurality of speed references the calculated travel speed of the object is equivalent; and obtaining an additional time corresponding to the determined speed reference from a plurality of additional times that are preset in correspondence to the plurality of speed references on a table.

The features of the present invention will become apparent from the embodiments of the present invention which will hereinafter be described with reference to the accompanying drawings.

Effects of the Invention

According to the above features of the present invention, display of a character on a first display screen can be changed to display of the character on a second display screen in consideration of a travel angle and a travel speed of the character at a nondisplay area present between display screens adjacent to each other. This allows a player's line of sight to follow the move of the character on display, which does not give the player a feeling of oddness and avoids the player's disadvantage in game proceeding.

PREFERRED EMBODIMENTS OF THE INVENTION

Embodiments of the present invention will now be described with reference to the drawings. The embodiments are described to facilitate understanding of the present invention, and do not limit the scope of the present invention.

Figure 4:
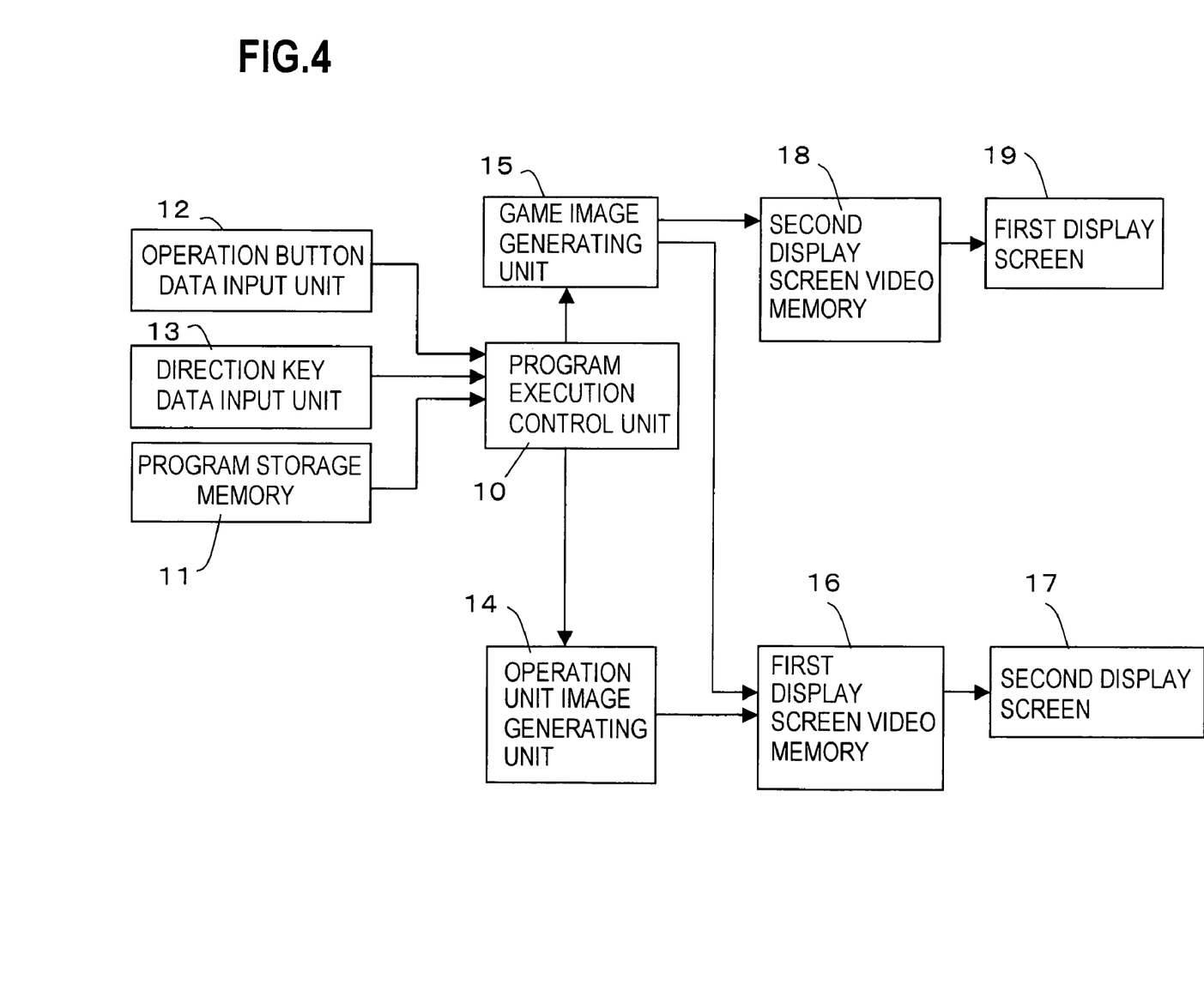
FIG. 4 is a block diagram of a configurative example of functional units in a case where the present invention applies to such a game machine as shown in the external view of FIG. 1.

FIG. 4 is a block diagram of a configurative example of functional units in a case where the present invention applies to such a game machine as shown in the external view of FIG. 1.

A program execution control unit 10 is usually equivalent to a functional unit including a CPU, and executes and controls a game program read out of a recording medium 11 storing programs, which is such a memory unit as CD-ROM, cassette memory, and memory chip.

In the course of execution of a program read out of the program storage memory 11, the program execution control unit 10 converts three-dimensional coordinate data, which is read out together with the program, into two-dimensional plane data, and sends the two-dimensional plane data to a game image generating unit 15.

In the course of game proceeding, the program execution control unit 10 sends the data also to an operation unit image generating unit 14, which generates an operation unit background image, such as an operation message to a player.

To the program execution control unit 10, data input by operation buttons 5 is input through an operation button data input unit 12, and data input by a direction key 6 is input through a direction key data input unit 13. The program execution control unit 10 associates these input signal conditions with a condition preset in the program to update image data, and sends the updated image data to the operation unit image generating unit 14 and to the game image generating unit 15.

Based on the data from the program execution control unit 10, the operation unit background image generating unit 14 pastes a texture of an operation message, etc., on the received data as an operation unit background image to generate operation screen data, and writes the operation screen data into a first display screen video memory 16.

Meanwhile, based on the data from the program execution control unit 10, the game image generating unit 15 pastes a texture on a polygon, etc., composing a character to generate game image data, and writes the game image data into a second display screen video memory 18.

The operation screen data written in the first display screen video memory 16 and the game image data written in the second display screen video memory 18 are output to the corresponding first display screen monitor 17 and the second display screen monitor 19, respectively, to be displayed thereon.

A display control program according to the feature of the present invention will be described for a case where a first display screen 1 and a second display screen 2 are combined into a single screen to display a game image in the configuration of the game machine of FIG. 4.

Figure 5:
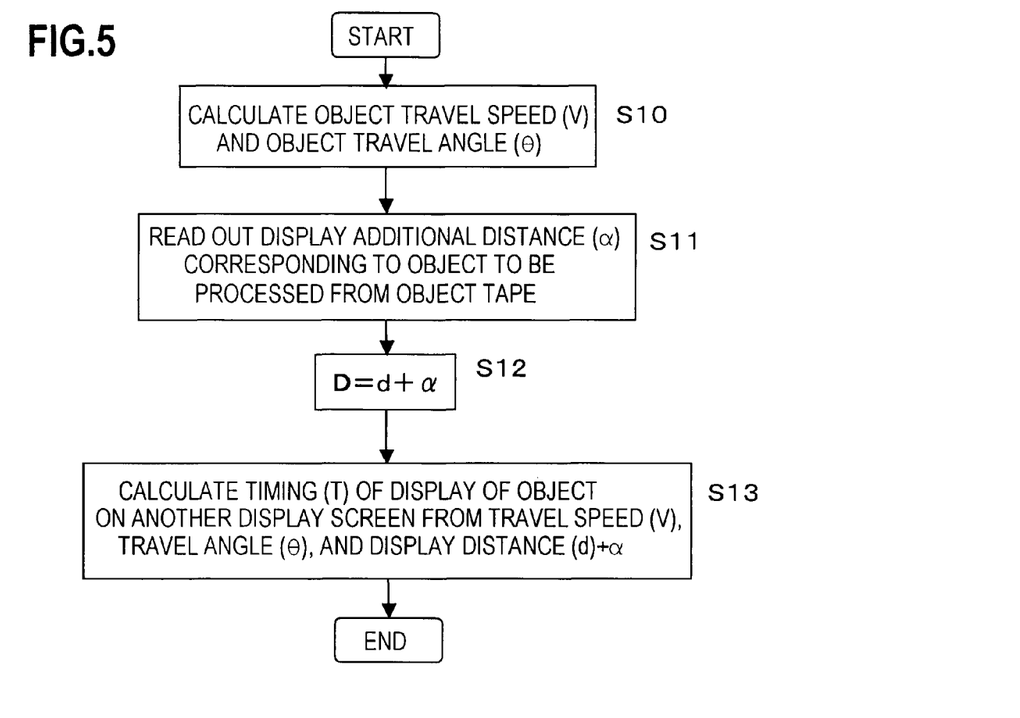
FIG. 5 is a flowchart of a first embodiment.

FIG. 5 is a flowchart of a first embodiment.

When an object OBJ reaches a given coordinate position on the first display screen 1, the program execution control unit 10 carries out control of display of the object OBJ in move to the second display screen 2 according to the present invention.

In this embodiment, the given coordinate position in displaying the object OBJ in move to the second display screen 2 is the position at which a reference point, which is determined to be a given position in the object OBJ, reaches a point of a given distance to the side of first display screen 1 that is in contact with a nondisplay area 7A.

For example, the object OBJ is given as a circle in FIG. 2. When the reference point of the object OBJ is the central point O of the circle and the given distance is the size of the radius of the circle, therefore, the presence of reference point O of the object OBJ at the given coordinate position is determined when the circumferential edge of the circular object OBJ reaches the side that is in contact with the nondisplay area 7A.

At this time, a travel angle ($\theta$) and a travel speed (v) of the object OBJ at a display coordinate position on the first display screen 1 is calculated (step S10), as shown in FIG. 5.

Figure 6:
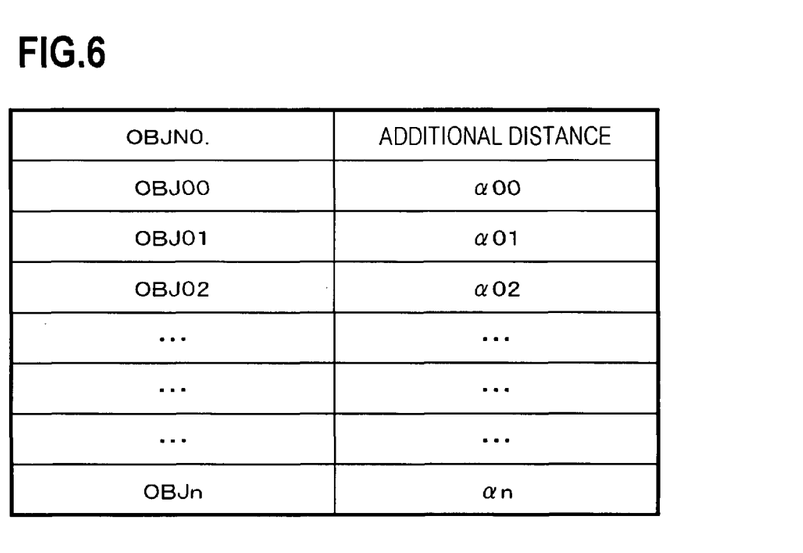
FIG. 6 is a diagram of an example of a table corresponds to the operation flow of FIG. 5.

FIG. 6 depicts an example of a table corresponding to the operation flow of FIG. 5. This table is a correspondence table of objects OBJ and additional distances, and is stored and held as a piece of program data in the program storage memory 11. From the correspondence table, a preset additional distance a corresponding to the object OBJ to be processed is read out (step S1). For example, an additional distance $\alpha 01$ is read out for an object represented by an object No. OBJ01.

This additional distance $\alpha$ is added to a travel distance d1 (=d/cos $\theta$) through the nondisplay area 7A, which travel distance d1 is calculated from the calculated travel angle ($\theta$) and travel speed (v) of the object OBJ at the coordinate position, to calculate a virtual travel distance D (step S12).

The virtual travel distance D is given by $$D = d/\cos\theta + \alpha$$

where d is the distance between the first display screen 1 and the second display screen 2 (see FIG. 2).

Thus, timing T of display of the object OBJ on the second display screen is calculated on the basis of the calculated virtual travel distance D, the travel speed (v), and the travel angle ($\theta$) relative to a vertical line L extending from the first display screen 1 to the second display screen 2.

In this manner, the present invention allows setting of a span of timing for display of the object OBJ in move to the second display screen larger than a span of timing (time) that is calculated from the distance of the nondisplay area 7A only. This allows the player's liner of sight to easily follow the move of the object OBJ on display.

Various methods are possible in determining the additional distance $\alpha$ that is preset in correspondence to the object OBJ. For example, determining the additional distance $\alpha$ according to the size of the object OBJ is preferable.

Specifically, such a method may be adopted that the additional distance $\alpha$ is determined to be small when the object OBJ is large and that the additional distance $\alpha$ is determined to be large when the object OBJ is small. The larger the object OBJ is, the easier for the player to visually recognize the object OBJ. In such a case, therefore, the player's line of sight can easily follow the move of the object OBJ even if the travel speed of the object OBJ at the nondisplay area 7A is increased (travel time is shortened), so that the additional distance $\alpha$ may be reduced.

Figure 7:
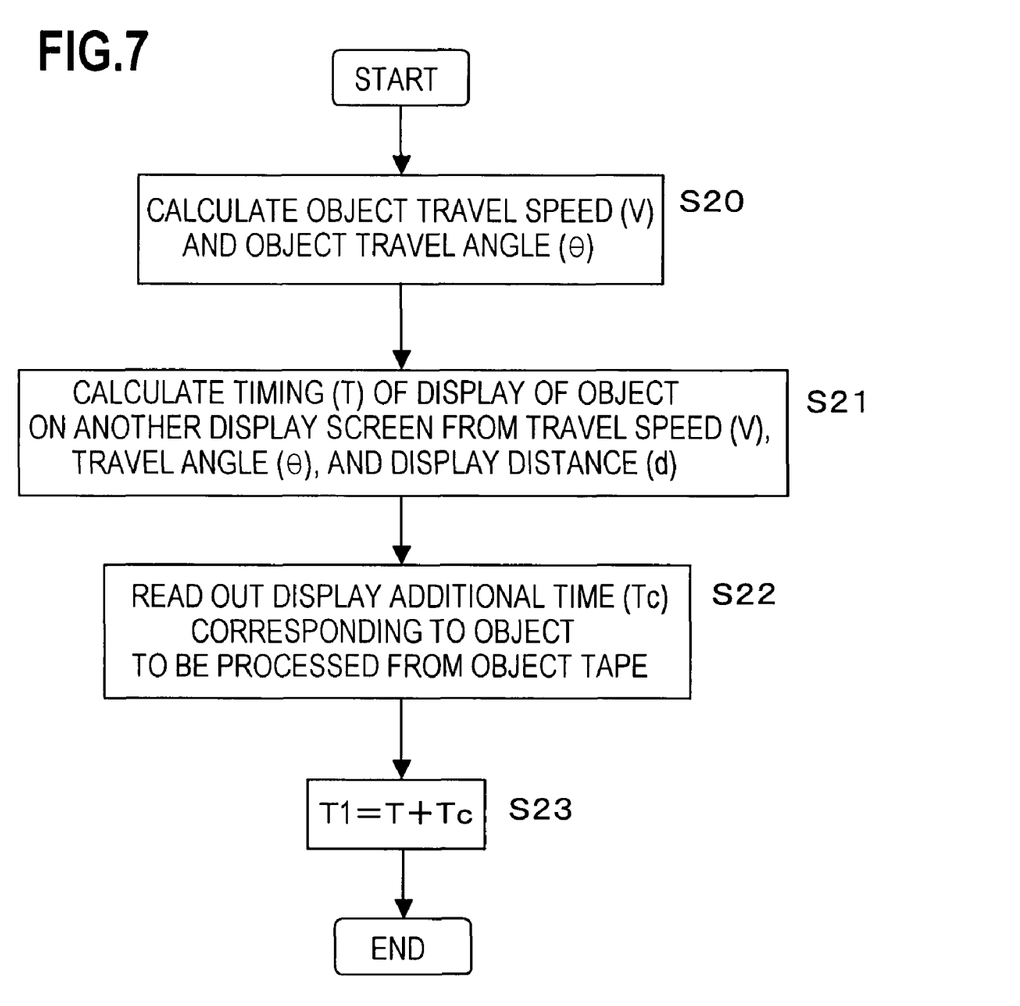
FIG. 7 is a flowchart of a second embodiment.

FIG. 7 is a flowchart of a second embodiment. In this embodiment, an additional time Tc instead of the additional distance $\alpha$ is set in the first embodiment shown in FIG. 5.

When the object OBJ is displayed in move from the first display screen 1 to the second display screen 2, a travel angle (θ) and a travel speed (v) of the object OBJ at a display coordinate position on the first display screen 1 is calculated (step S20).

Then, a travel time T for the object OBJ to take to travel through the nondisplay area 7A is calculated from the calculated travel angle (θ) and travel speed (V) (step S21).

Subsequently, the additional time Tc preset in correspondence to the object OBJ is added to the calculated travel time T to obtain a virtual travel time T1 (step S23). When the virtual travel time T1 has passed, the object OBJ is displayed on the second display screen.

In the case of the embodiment of FIG. 7, additional distances α are replaced with additional times Tc on the table of FIG. 6, where each additional time Tc is set for each object.

Figure 8:
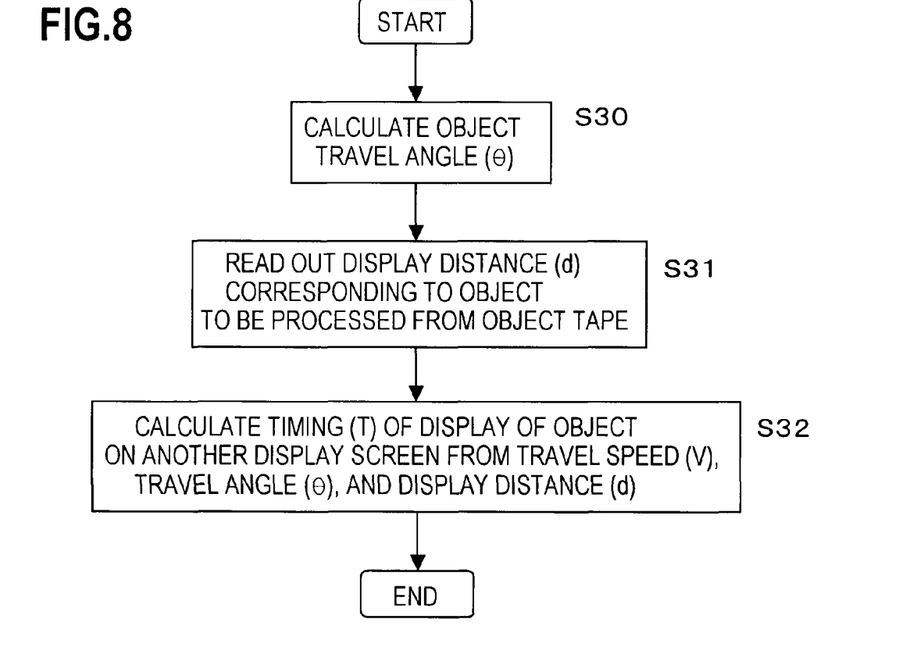
FIG. 8 is an operation flowchart of a third embodiment of the present invention.

FIG. 8 is an operation flowchart of a third embodiment of the present invention. In this embodiment, objects OBJ, object travel speeds (v), and relative display distances (d) are combined in a corresponding relation on a table shown in FIG. 9.

Figure 9:
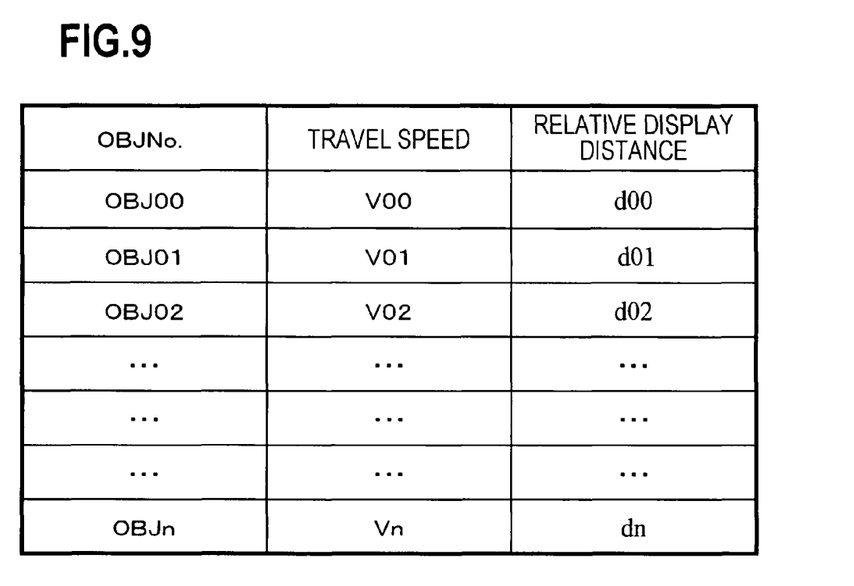
FIG. 9 is an example of a table for the embodiment shown in FIG. 8.

The object travel speed (v) is expressed in a unit of (pixel/frame), and the relative display distance (d) is a virtual distance that changes relative to the actual distance d between the first and second display screens 1 and 2 according to the object travel speed (v).

"Present travel speed" of each object OBJ is calculated (detected) (step S30), and a relative display distance is read from the table of FIG. 9 on the basis of the detected travel speed (step S31).

Then, timing T of display of the object OBJ on the second display screen 2 is calculated on the basis of the travel speed (v) and relative display distance (d), which are read out from the table, and a precalculated travel direction, i.e., travel angle (θ) of the object OBJ to be displayed (step S32).

In this embodiment, setting of the relative display distance (d) provides setting that allows the player's line of sight to easily follow the speed of move of the object OBJ through the nondisplay area 7A.

Figure 10:
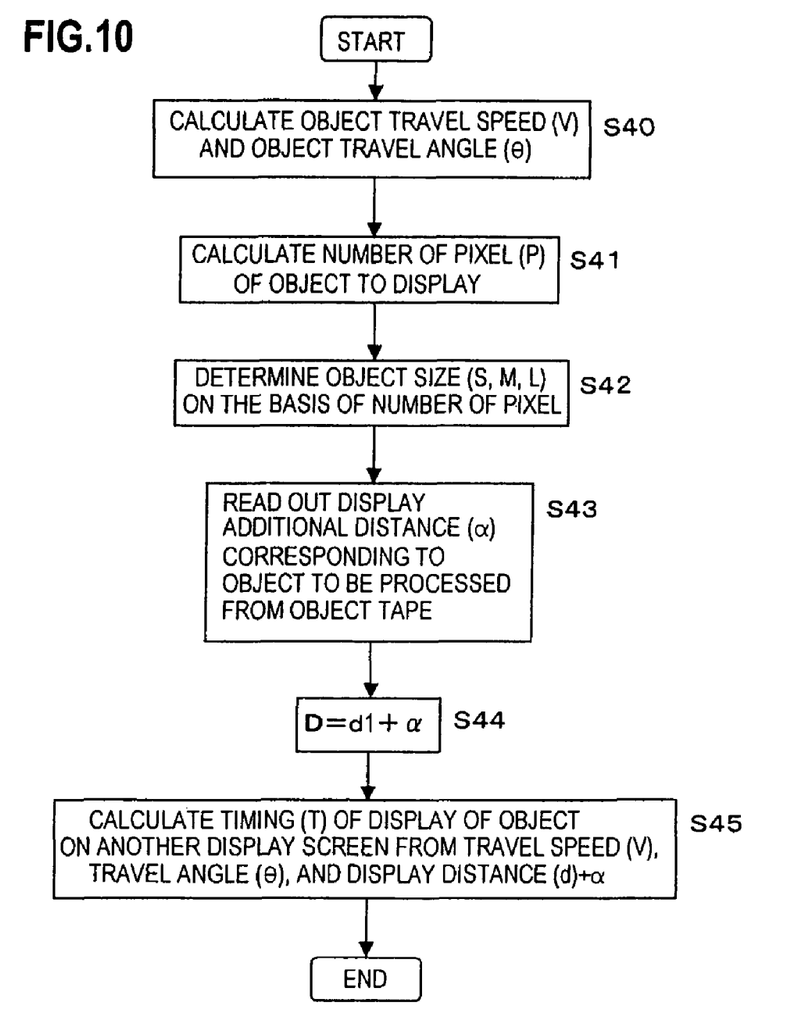
FIG. 10 is an operation flowchart of a fourth embodiment.

FIG. 10 is an operation flowchart of a fourth embodiment. In this embodiment, the size of the object OBJ is classified into L, M, and S, and additional distances corresponding to the sizes L, M, and S are set on a table shown in FIG. 11.

Figure 11:
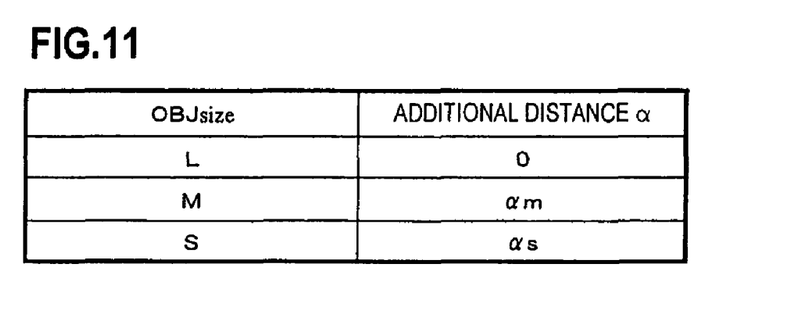
FIG. 11 is an example of a table for the embodiment of FIG. 10.

The sizes L, M, and S are so set as to have the relation: L>d (d is the actual physical distance between the first and second display screens 1 and 2)>M>S. When the size of the object OBJ to display is L, an additional distance leads to the deformed appearance of the object OBJ, so that the additional distance for the object size L is determined to be zero.

Additional distances αs and αm are set to have a relation of αs>αm, which means an additional distance longer than an additional distance for the object size M is given when the size of the object OBJ is S. This solves the problem that the player is likely to miss a smaller object OBJ.

Referring to FIG. 11, the program execution control unit 10 calculates a travel speed (v) and a travel angle (θ) of the object OBJ when the object OBJ reaches the given coordinate position on the first display screen 1 (step S40).

Then, the number of pixels (P) of the object OBJ is calculated (step S41). Based on the calculated number of pixels (P), which one of sizes L, M, and S the size of the object OBJ corresponds to is determined (step S42).

The additional distance α corresponding to the determined size of the object OBJ is obtained from the table of FIG. 11, and is added to the distance d between the first and second display screens 1 and 2. Hence a distance of passage through the nondisplay area 7A by the object OBJ is given by $$D=d+\alpha$$

Figure 12:
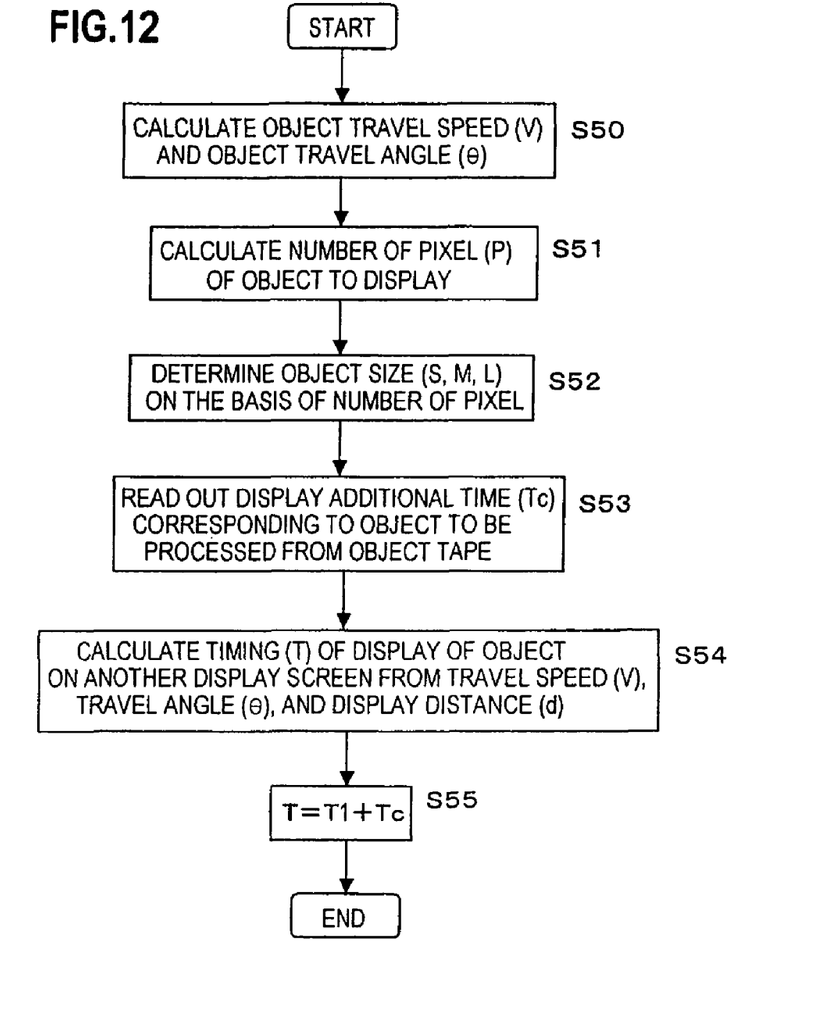
FIG. 12 is an operation flowchart of an embodiment in which an additional distance introduced in the embodiment of FIG. 10 is replaced with an additional time.
Figure 13:
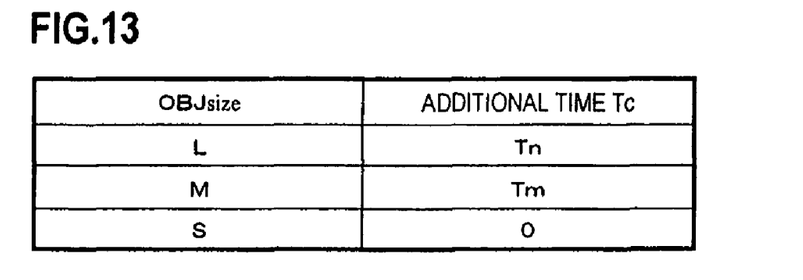
FIG. 13 is an example of a table for the embodiment of FIG. 12.

Based on the calculated passage distance D, timing T of appearance of the object OBJ on the second display screen 2 is calculated (step S45). While object sizes are classified into three classes of L, M, and S on the table of FIG. 11 in the above description, the object sizes may be classified further into subdivided classes. In addition, additional distances on the table of FIG. 11 may be replaced with additional times, as described above in relation to the embodiment of FIG. 5. This case leads to an operation flowchart shown in FIG. 12, and to a table shown in FIG. 13 corresponding to the operation flowchart, where Tm>Tn.

Figure 14:
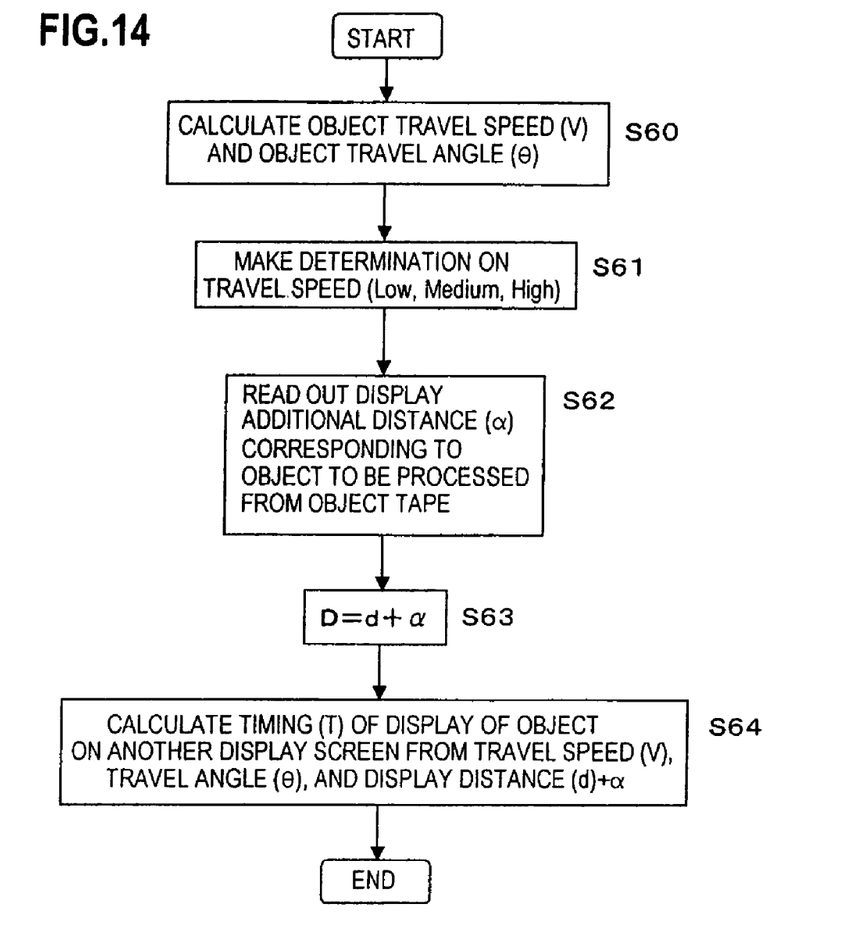
FIG. 14 is an operation flowchart of a fifth embodiment.

FIG. 14 is an operation flowchart of a fifth embodiment of the present invention. In this embodiment, the program execution control unit 10 calculates a travel speed (v) and a travel angle (θ) of the object OBJ when the object OBJ reaches the given coordinate position on the first display screen 1 (step S60). The travel speed (v) of the object OBJ is classified into three classes of speeds of Low, Medium, and High, and which one of speeds of Low, Medium, and High the calculated travel speed (v) belongs to is determined (step S61).

Figure 15:
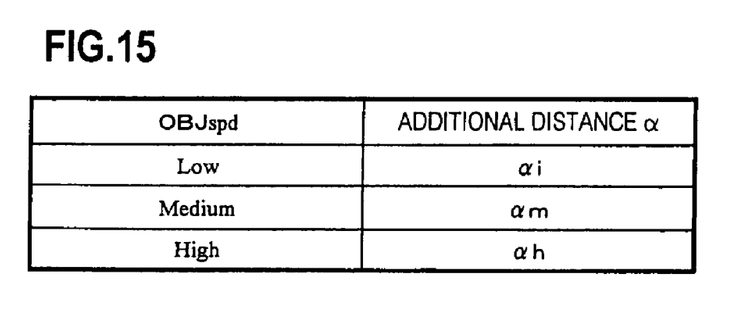
FIG. 15 is an example of a table for the embodiment of FIG. 14.

Then, a corresponding table listing additional distances α corresponding to travel speeds of the object OBJ is provided, as shown in FIG. 15.

The additional distance α corresponding to the determined speed is then read out (step S62), and is added to the distance d between the first and second display screens to obtain a travel speed D (step S63).

Thus, timing T of display of the object OBJ on the second display screen 2 is calculated from the travel speed (v), the travel angle (θ), and the travel distance D (step S64).

In the operation flowchart of FIG. 14, an additional time Tc may be added in correspondence to each of classified three classes of speeds, instead of determining the additional distance α as shown in FIG. 15.

Figure 16:
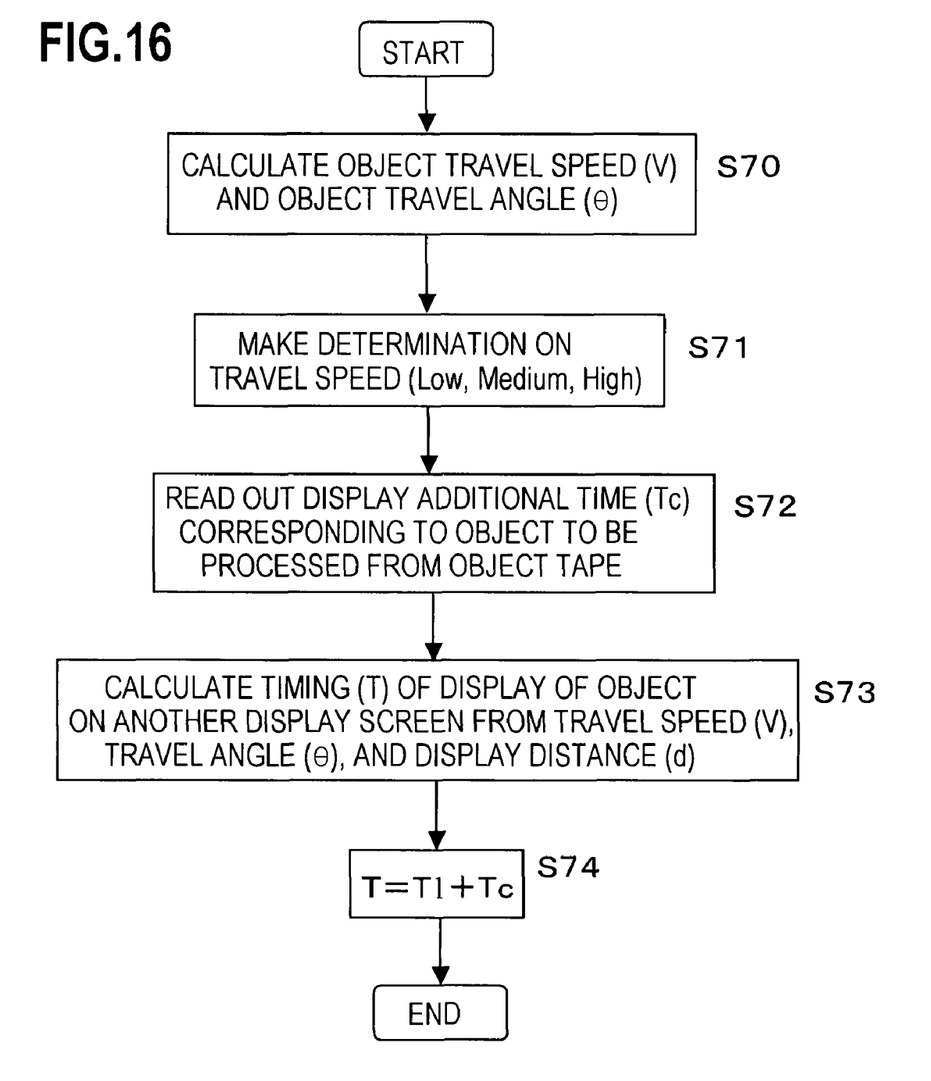
FIG. 16 is an operation flowchart of an embodiment in which an additional distance introduced in the embodiment of FIG. 14 is replaced with an additional time.

FIG. 16 depicts an operation flowchart including the additional time Tc, in which the additional time Tc is determined in correspondence to the speed of the object (step S72).

Timing T of display of the object OBJ on the second display screen 2 is thus calculated on the basis of the travel speed (v), the travel angle (θ), and the distance between the first and second display screens 1 and 2 (steps S73 and S74).

Figure 17:
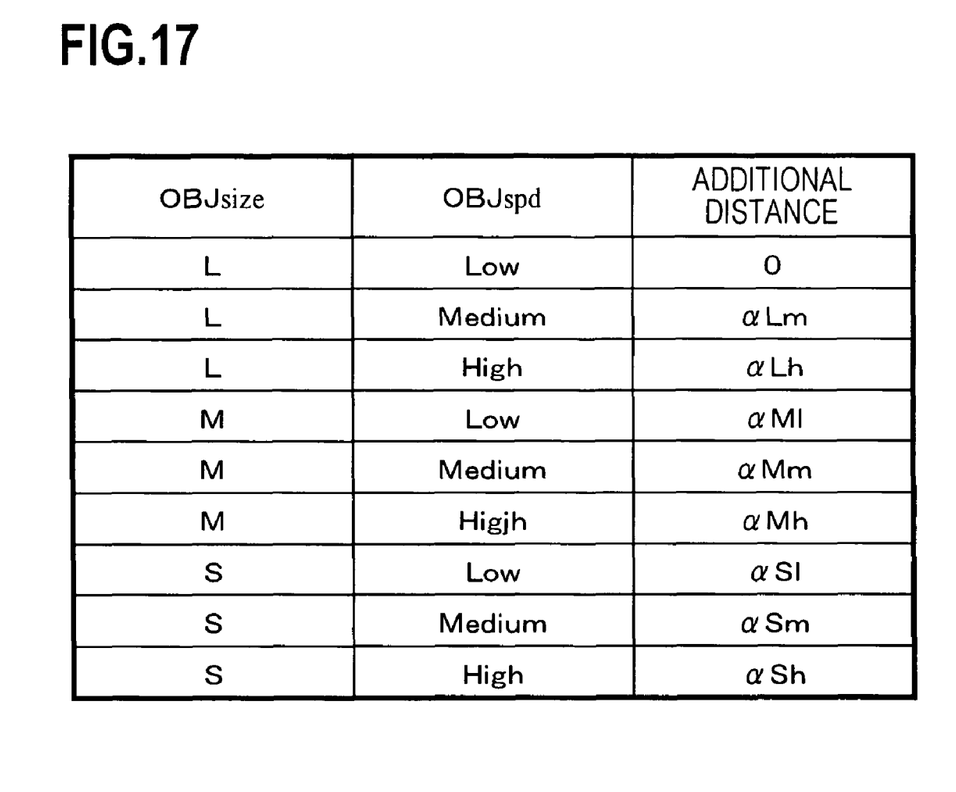
FIG. 17 is an example of a table configuration in an embodiment in which an additional distance corresponding to an object is determined on the basis of a combination of the size and speed of the object.

FIG. 17 is an example of setting of a table in still another embodiment. The additional distance α is determined in correspondence only to the speed of the object in the embodiment of FIG. 14. In contrast, an additional distance is determined in correspondence to a combination of the size and speed of the object OBJ in the embodiment of FIG. 17.

Specifically, a slowly moving object OBJ allows the player's line of sight to easily follow the move of the object OBJ. Contrary to that, a smaller and faster object OBJ makes it difficult for the player's line of sight to follow the move of the object OBJ. For this reason, additional distances subdivided in detail are set in correspondence to the sizes and speeds of the object OBJ on the table of FIG. 17.

When the object OBJ is small and moves at high speed, a maximum additional distance is added.

INDUSTRIAL APPLICATION

As described above, the present invention allows display of an object in move without giving a player a feeling of oddness even when a nondisplay area having a physical distance is present between different display screens. The present invention also provides a program for controlling image display that does not give the player a disadvantage in game proceeding. The present invention, therefore, makes a great contribution to the industrial field.

What is claimed is:

1. A game machine program embodied on a computer-readable non-transitory storage medium and configured to cause the game machine, having a first display screen and a second display screen adjacent to each other across a nondisplay area, when the program is read from the storage medium and executed by a controller of the game machine, to execute the steps comprising:

calculating a travel angle and a travel speed of an object at a display coordinate position on the first display screen when the object is displayed in move from the first display screen to the second display screen;

calculating a travel distance of the object's travel through the nondisplay area from the calculated travel angle;

reading out information of an additional distance from a memory means, the information being preset in correspondence to the object, to add the additional distance to the calculated travel distance to obtain a virtual travel distance;

calculating a travel time to take to travel through the virtual travel distance from the calculated travel speed and the virtual travel distance; and displaying the object on the second display screen when the calculated travel time has passed after the object has moved to disappear from the first display screen.

2. The game machine program according to claim 1, wherein the display coordinate position of the object is a position at which a given point as a reference point in the object has reached a point of a given distance from a side of the first display screen that is in contact with the nondisplay area.

3. The game machine program according to claim 1, further comprising the steps:

calculating the number of pixels forming the object;

determining a size of the object from the calculated number of pixels; and obtaining an additional distance corresponding to the determined size from a plurality of additional distances that are preset in correspondence to sizes of the object on a table.

4. The game machine program according to claim 1, further comprising the steps:

determining to which one of a plurality of speed references the calculated travel speed of the object is equivalent; and obtaining an additional distance corresponding to the determined speed reference from a plurality of additional distances that are preset in correspondence to the plurality of speed references on a table.

5. A game machine program embodied on a computer-readable non-transitory storage medium and configured to cause the game machine, having a first display screen and a second display screen adjacent to each other across a nondisplay area, when the program is read from the storage medium and executed by a controller of the game machine, to execute the steps comprising:

calculating a travel angle and a travel speed of an object at a display coordinate position on the first display screen when the object is displayed in move from the first display screen to the second display screen;

calculating a travel time for the object to take to travel through the nondisplay area from the calculated travel angle and the travel speed;

adding an additional time to the calculated travel time, the additional time being preset in correspondence to the object, to obtain a virtual travel time; and displaying the object on the second display screen when the virtual travel time has passed.

6. The game machine program according to claim 5, wherein the display coordinate position of the object is a position at which a given point as a reference point in the object has reached a point of a given distance from a side of the first display screen that is in contact with the nondisplay area.

7. The game machine program according to claim 5, further comprising the steps:

calculating the number of pixels forming the object;

determining a size of the object from the calculated number of pixels; and obtaining an additional time corresponding to the determined size from a plurality of additional times that are preset in correspondence to sizes of the object on a table.

8. The game machine program according to claim 5, further comprising the steps:

determining to which one of a plurality of speed references the calculated travel speed of the object is equivalent; and obtaining an additional time corresponding to the determined speed reference from a plurality of additional times that are preset in correspondence to the plurality of speed references on a table.

9. A game machine program embodied on a computer-readable non-transitory storage medium and configured to cause the game machine, having a first display screen and a second display screen adjacent to each other across a nondisplay area, when the program is read from the storage medium and executed by a controller of the game machine, to execute the steps comprising:

calculating a travel angle of an object at a display coordinate position on the first display screen when the object is displayed in move from the first display screen to the second display screen;

reading out a travel speed and a distance of the nondisplay area, the travel speed and the distance being preset on a table in correspondence to the object;

calculating a virtual travel time to take to travel through the distance of the nondisplay area from the calculated travel angle, and the read out travel speed and distance of the nondisplay area; and displaying the object on the second display screen when the virtual travel time has passed.

10. The game machine program according to claim 9, wherein the display coordinate position of the object is a position at which a given point as a reference point in the object has reached a point of a given distance from a side of the first display screen that is in contact with the nondisplay area.

11. A recording medium having stored thereon a program executed in a game machine having a first display screen and a second display screen adjacent to each other across a non-display area, the program operable to drive an image display control means to carry out the processes of:

calculating a travel angle and a travel speed of an object at a display coordinate position on the first display screen when the object is displayed in move from the first display screen to the second display screen;

calculating a travel distance of the object's travel through the nondisplay area from the calculated travel angle;

reading out information of an additional distance from a memory means, the information being preset in correspondence to the object, to add the additional distance to the calculated travel distance to obtain a virtual travel distance, and calculating a travel time to take to travel through the virtual travel distance from the calculated travel speed and the virtual travel distance; and displaying the object on the second display screen when the calculated travel time has passed after the object has moved to disappear from the first display screen.

12. The recording medium having a program stored thereon of claim 11, wherein the display coordinate position of the object in the program is a position at which a given point as a reference point in the object has reached a point of a given distance from a side of the first display screen that is in contact with the nondisplay area.

13. The recording medium having a program stored thereon of claim 11, the program further comprising the processes of:

calculating the number of pixels forming the object;
determining a size of the object from the calculated number of pixels; and
obtaining an additional distance corresponding to the determined size from a plurality of additional distances that are preset in correspondence to the size of the object on a table.

14. The recording medium having a program stored thereon of claim 11, the program further comprising the processes of:

determining to which one of a plurality of speed references the calculated travel speed of the object is equivalent; and
obtaining an additional distance corresponding to the determined speed reference from a plurality of additional distances that are preset in correspondence to the plurality of speed references on a table.

15. A recording medium having stored thereon a program executed in a game machine having a first display screen and a second display screen adjacent to each other across a nondisplay area, the program operable to drive an image display control means to carry out the processes of:

calculating a travel angle and a travel speed of an object at a display coordinate position on the first display screen when the object is displayed in move from the first display screen to the second display screen;
calculating a travel time for the object to take to travel through the nondisplay area from the calculated travel angle and the travel speed; and
adding an additional time to the calculated travel time, the additional time being preset in correspondence to the object, to obtain a virtual travel time, and displaying the object on the second display screen when the virtual travel time has passed.

16. The recording medium having a program stored thereon of claim 15, wherein the display coordinate position of the object in the program is a position at which a given point as a reference point in the object has reached a point of a given distance from a side of the first display screen that is in contact with the nondisplay area.

17. The recording medium having a program stored thereon of claim 15, the program further comprising the processes of:

calculating the number of pixels forming the object;
determining a size of the object from the calculated number of pixels; and
obtaining an additional time corresponding to the determined size from a plurality of additional times that are preset in correspondence to the size of the object on a table.

18. The recording medium having a program stored thereon of claim 15, the program further comprising the processes of:

determining to which one of a plurality of speed references the calculated travel speed of the object is equivalent; and
obtaining an additional time corresponding to the determined speed reference from a plurality of additional times that are preset in correspondence to the plurality of speed references on a table.

19. A recording medium having stored thereon a program executed in a game machine having a first display screen and a second display screen adjacent to each other across a nondisplay area, the program operable to drive an image display control means to carry out the processes of:

calculating a travel angle of an object at a display coordinate position on the first display screen when the object is displayed in move from the first display screen to the second display screen;
reading out a travel speed and a distance of the nondisplay area, the travel speed and the distance being preset on a table in correspondence to the object;
calculating a virtual travel time to take to travel through the distance of the nondisplay area from the calculated travel angle, and the read out travel speed and distance of the nondisplay area; and
displaying the object on the second display screen when the virtual travel time has passed.

20. The recording medium having a program stored thereon of claim 19, wherein the display coordinate position of the object in the program is a position at which a given point as a reference point in the object has reached a point of a given distance from a side of the first display screen that is in contact with the nondisplay area.

* * * * *